(12) United States Patent
Mayer et al.

(10) Patent No.: US 12,254,515 B1
(45) Date of Patent: Mar. 18, 2025

(54) SMART CONTRACT NETWORK TO ENABLE REAL-TIME SWAPPING OF DIGITAL ASSETS USING MINTING ON-DEMAND

(71) Applicant: CIRCLE INTERNET FINANCIAL, LTD., Dublin (IE)

(72) Inventors: Rachel Mayer, Boston, MA (US); Adrian Soghoian, Boston, MA (US); Erik Tierney, Boston, MA (US); Kaili Wang, Boston, MA (US)

(73) Assignee: CIRCLE INTERNET FINANCIAL, LTD., Dublin (IE)

( * ) Notice: Subject to any disclaimer, the term of this patent is extended or adjusted under 35 U.S.C. 154(b) by 0 days.

(21) Appl. No.: 18/890,044

(22) Filed: Sep. 19, 2024

Related U.S. Application Data

(60) Provisional application No. 63/539,379, filed on Sep. 20, 2023.

(51) Int. Cl.
*G06Q 40/04* (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS

| | | |
|---|---|---|
| 11,501,370 B1 | 11/2022 | Paya et al. |
| 2021/0073913 A1 | 3/2021 | Ingargiola |
| 2023/0123865 A1 | 4/2023 | Quigley et al. |
| 2023/0141423 A1* | 5/2023 | Fantini .................. G06Q 20/065 705/37 |
| 2023/0298064 A1* | 9/2023 | Whitt .................... G06Q 20/389 705/14.13 |

(Continued)

FOREIGN PATENT DOCUMENTS

| | | | |
|---|---|---|---|
| EP | 4099248 A1 * | 12/2022 | ......... G06Q 20/0655 |
| WO | WO-2020092900 A2 * | 5/2020 | ........... G06F 21/602 |

(Continued)

OTHER PUBLICATIONS

Semonov, D: Transferring Tokens Across Blockchains: The Definitive Guide to Bridges, Atomic Swaps, and More, Sep. 5, 2021, Discover Anything, pp. 1-14 (Year: 2021).*

(Continued)

*Primary Examiner* — Bijendra K Shrestha
(74) *Attorney, Agent, or Firm* — Fish & Richardson P.C.

(57) ABSTRACT

Implementations of the present disclosure can include actions of receiving, by a first smart contract and from a first account, a redemption request for a swap transaction to redeem an amount of the first digital asset for an amount of the second digital asset, responsive to the redemption request, initiating, by the first smart contract, a transfer of a first number of tokens of the first digital asset from the first account to the second account, and notifying, by the first smart contract, a second smart contract, and in response to notification by the first smart contract, initiating, by the second smart contract, minting of the second number of tokens of the second digital asset and transfer of the second number of tokens of the second digital asset to the first account.

14 Claims, 3 Drawing Sheets

(56) References Cited

U.S. PATENT DOCUMENTS

2024/0202679 A1 6/2024 Mayerchak et al.

FOREIGN PATENT DOCUMENTS

| WO | WO-2020247773 A1 | * | 12/2020 | ......... G06Q 20/0658 |
| WO | WO-2023172729 A1 | * | 9/2023 | |

OTHER PUBLICATIONS

Coinbase: How to swap tokens with Coinbase Wallet, Jun. 30, 2022, pp. 1-10 (Year: 2022).*
Basel Committee on Banking Sopervision: Prudential Treatment of Cryptoasset exposures, Dec. 2022, pp. 1-36 (Year: 2022).*
International Search Report and Written Opinion in International Appln. No. PCT/US2024/047801, mailed on Dec. 10, 2024, 9 pages.

* cited by examiner

# SMART CONTRACT NETWORK TO ENABLE REAL-TIME SWAPPING OF DIGITAL ASSETS USING MINTING ON-DEMAND

CROSS-REFERENCE TO RELATED APPLICATIONS

This application claims priority to and the benefit of U.S. Prov. App. 63/539,379 filed on Sep. 20, 2023, which is incorporated herein by reference in the entirety for all purposes.

TECHNICAL FIELD

This specification relates generally to digital assets and more particularly to redemption of a digital asset for another digital asset.

BACKGROUND

Users can hold digital assets as stores of value and investments. Example digital assets can include cryptocurrencies and tokenized funds. In some instances, users can redeem one digital asset for another digital asset. To achieve this, a user sells a digital asset for an intermediate asset (e.g., a non-digital asset such as a fiat currency) then uses the intermediate asset to purchase another digital asset.

SUMMARY

This specification describes systems, methods, devices, and other techniques relating to real-time redemption of a digital asset for another digital asset. More particularly, implementations of the present disclosure are directed to a smart contract network that enables real-time redemption of a first digital asset for a second digital asset by minting tokens of the second digital asset on-demand. In some implementations, redemption of the first digital asset for the second digital asset is achieved absent use of an intermediate asset.

In general, innovative aspects of the subject matter described in this specification can include actions of receiving, by a first smart contract and from a first account, a redemption request for a swap transaction to redeem an amount of the first digital asset for an amount of the second digital asset, responsive to the redemption request, initiating, by the first smart contract, a transfer of a first number of tokens of the first digital asset from the first account to the second account, and notifying, by the first smart contract, a second smart contract, and in response to notification by the first smart contract, initiating, by the second smart contract, minting of the second number of tokens of the second digital asset and transfer of the second number of tokens of the second digital asset to the first account. Other implementations of this aspect include corresponding systems, apparatus, and computer programs, configured to perform the actions of the methods, encoded on computer storage devices.

These and other implementations can each optionally include one or more of the following features: the second number of tokens is minted by a liquidity source minter in response to a function executed by the second smart contract; actions further including determining that the redemption request is valid; determining that the redemption request is valid includes determining that the first account is allowed to initiate swap transactions; the second account is owned by an entity that mints the second digital asset; the first digital asset comprises a tokenized money market fund (T-MMF) and the second digital asset includes a stablecoin; and the first smart contract and the second smart contract are provided as a single smart contract.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
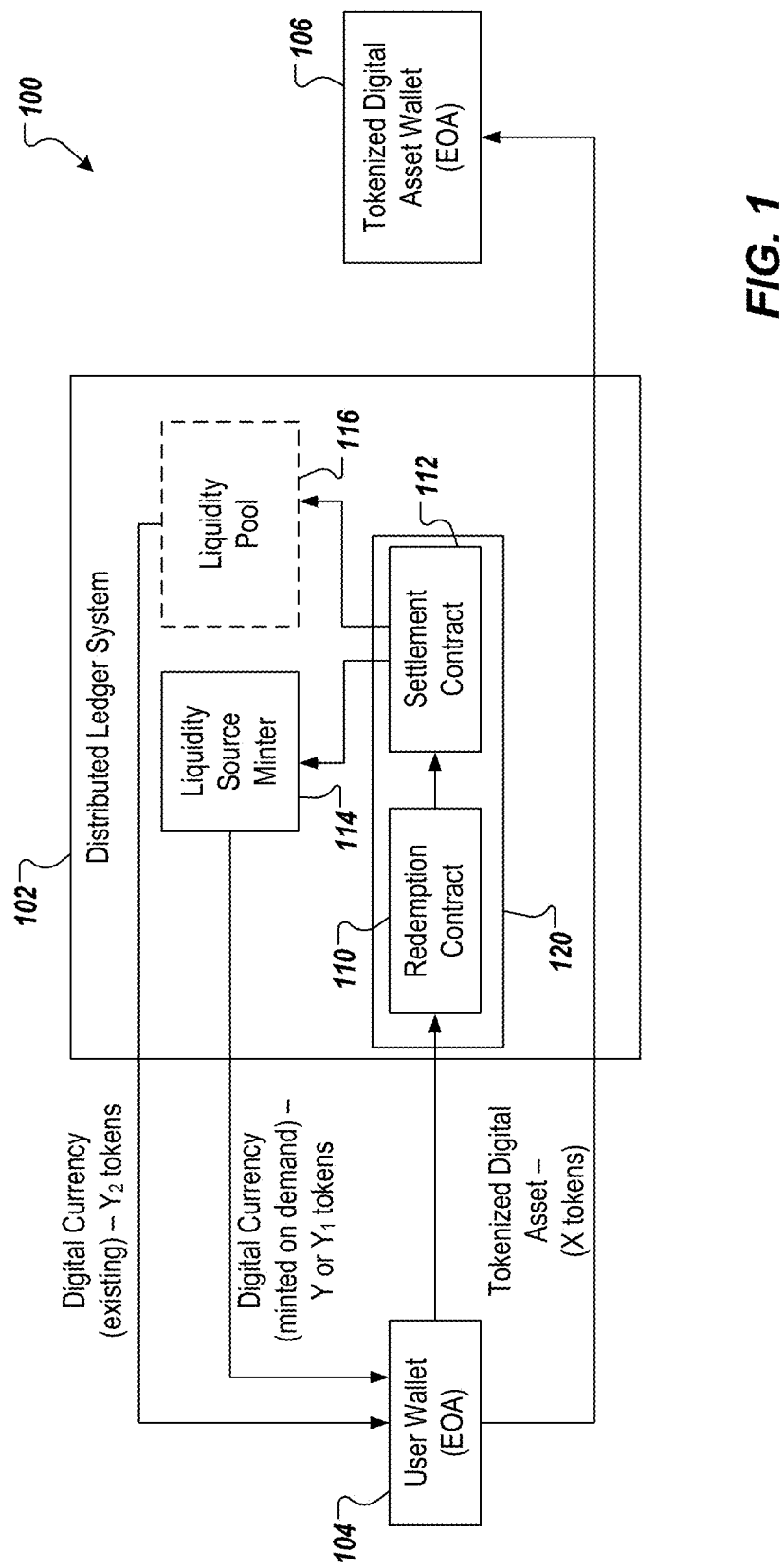
FIG. 1 is a conceptual architecture in accordance with implementations of the present disclosure.

The technology of this patent application is directed to real-time redemption of a first digital asset for a second digital asset. More particularly, implementations of the present disclosure are directed to a smart contract network that enables real-time redemption of a first digital asset for a second digital asset by minting tokens of the second digital asset on-demand. In some implementations, the first digital asset is redeemed for the second digital asset absent use of an intermediate asset. In some implementations, actions include receiving, by a first smart contract and from a first account, a redemption request for a swap transaction to redeem an amount of the first digital asset for an amount of the second digital asset, responsive to the redemption request, initiating, by the first smart contract, a transfer of a first number of tokens of the first digital asset from the first account to the second account, and notifying, by the first smart contract, a second smart contract, and in response to notification by the first smart contract, initiating, by the second smart contract, minting of the second number of tokens of the second digital asset and transfer of the second number of tokens of the second digital asset to the first account.

As used herein, real-time can describe one or more operations that are performed without any intentional delay, taking into account the processing, and/or communication limitations of the computing system(s) performing the operation(s) and the time needed to initiate, and/or perform the operation(s). Real-time can be used to describe operations that are automatically executed in response to a triggering event, for example, without requiring human input after occurrence of the triggering events.

To provide context for the subject matter of the present disclosure, and as introduced above, users can hold digital assets as stores of value and mediums of exchange. In general, a digital asset can be described as a virtual store of value that leverages a peer-to-peer network to store, record, and validate transactions. The peer-to-peer network can maintain a distributed ledger (e.g., blockchain), which can be described as a decentralized database that immutably stores transactions across the peer-to-peer network. Example digital assets can include, without limitation, cryptocurrencies (e.g., stablecoins), non-fungible tokens (NFTs), security tokens, tokenized money market funds (T-MMF), and the like (e.g., tokenized government obligations). For purposes of non-limiting illustration, implementations of the present disclosure are described in further detail herein with reference to a stablecoin as a first digital asset and a T-MMF as a second digital asset. It is contemplated, however, that implementations of the present disclosure can be realized using any appropriate digital assets.

In some examples, a cryptocurrency can be described as a digital currency that uses cryptography to secure transactions that are recorded in a distributed ledger (e.g., blockchain). In some examples, a stablecoin can be described as a cryptocurrency having a value that is tied (pegged) to the value of a real-world, non-digital asset, such as a fiat currency, a commodity, or a financial instrument. Stablecoins are absent the volatility of other cryptocurrencies and, as such, are a useful medium of exchange. An example stablecoin includes, without limitation, USDC™. In some examples, a T-MMF can be described as a MMF (or a private fund with government bonds) that issues a digital token on a distributed ledger, the digital token being tradeable and redeemable. In some examples, a digital token (also referred to as a token) can be described as immutable, computer-readable code that represents an asset and is stored in a distributed ledger.

Implementations of the present disclosure are described in further detail herein with reference to example peer-to-peer networks (also referred to herein as chain networks), each maintaining a respective chain. Some example peer-to-peer networks can each be described as an Ethereum-compatible network. Ethereum can be described as a decentralized computing infrastructure that executes a virtual machine, referred to as the Ethereum virtual machine (EVM), to execute transactions on a chain. The EVM can be described as a global singleton and operates as a single-instance computer, globally across nodes of the peer-to-peer network. That is, each node in the network executes a local copy of the EVM to execute transactions on the chain. The chain of the peer-to-peer network records the changing state of the EVM as transactions are processed. While Ethereum is referenced herein for purposes of illustration, it is contemplated that implementations of the present disclosure can be realized using any appropriate peer-to-peer network (e.g., networks that provide on-chain computing; EVM-compatible chains). Example peer-to-peer networks can include, without limitation, Arbitrum, Avalanche, and Base, among several others, each of which is EVM-compatible. It is contemplated, however, that implementations of the present disclosure can be realized on non-EVM peer-to-peer networks, such as Solana, Aptos, Sui, and the like.

In general, tokens of a digital asset can be generated using a minting process. Minting can generally be described as generating tokens of a digital asset through execution of cryptographic transactions within a network and recording the transactions in a blockchain maintained within the network. In some examples, minting is executed through a minting function of a smart contract (minter) that is executed within the network. On the other hand, tokens of a cryptocurrency can be permanently removed from circulation within a network using a burning process. Burning can generally be described as permanently removing tokens of a cryptocurrency from circulation through execution of cryptographic transactions within a network and recording the transactions in a blockchain maintained within the network. In some examples, burning is executed through a burning function of a smart contract (burner) that is executed within the network. Smart contracts can be described as programs that are executed on-chain and are each provided as a collection of code (functions) and data (state) that resides at a specific address on the chain.

In some instances, users can redeem a first digital asset for a second digital asset. In traditional approaches, a user sells an amount of the first digital asset for an intermediate asset (e.g., currency, such as the U.S. dollar (USD)) then uses the intermediate asset to purchase an amount of the second digital asset. For example, a user can redeem an amount of a T-MMF for an equivalent amount of USD and can use the USD to purchase an amount of USDC™. In this example, the USD is the intermediate asset.

Such transactions, however, present multiple technical inefficiencies. For example, multiple transactions are performed on the distributed ledger, which results in multiplied consumption of technical resources (e.g., processing, memory, bandwidth). Hence, a technical problem exists in the form of inefficiencies in consumption of technical resources. As another example, selling a digital asset for an intermediate asset can include significant time delays. For example, it can take one or more business days to sell a T-MMF and receive USD. As another example, new increments of a stablecoin cannot be minted until receipt of the intermediate asset, because the stablecoin is pegged 1:1 with the intermediate asset. Hence, the delay in receiving USD from the sale of the T-MMF results in a delay in minting the stablecoin. As another example, user experience (UX) is diminished in that users must initiate multiple transactions over an extended period of time, which also consumes technical resources on the front-end (e.g., processors, memory, etc. consumed by user-side devices to initiate the multiple transactions).

In some approaches, a liquidity pool can be provided, which maintains a reserve of a digital asset. For example, the liquidity pool can maintain a reserve of the stablecoin. In such approaches, the amount of T-MMF can be redeemed for an equivalent amount of the stablecoin from the liquidity pool. However, for any particular period of time, amounts that can be redeemed are constrained to the amount available in the liquidity pool. Further, the liquidity pool must be maintained, monitored, and replenished. This consumes technical resources (e.g., processing, memory, bandwidth).

In view of the foregoing, implementations of the present disclosure are directed to a smart contract network that enables real-time redemption of a first digital asset for a second digital asset by minting an amount of the second digital asset on-demand. As described in further detail herein, the smart contract network enables the redemption to be executed as a single, atomic transaction that is initiated by a user (e.g. a holder of the first digital asset). In some examples, the smart contract network includes a redemption smart contract and a settlement smart contract. In some examples, the redemption smart contract and the settlement smart contract are separate and distinct smart contracts. In this manner, a clear division of responsibilities is provided between entities involved in the transaction (swap) and there is a reduced technical burden to operationalize (e.g., no multi-signature is required). In some examples, the redemption smart contract and the settlement smart contract are integrated into a single smart contract.

As described herein, implementations of the present disclosure enable scalable redemptions of a tokenized asset (e.g., a T-MMF, tokenized government obligations) into a digital asset that is backed by a reserve (e.g., a fiat-backed stablecoins) through minting new tokens of the digital asset on-demand. Because the tokenized asset is treated as a reserve asset for, in this example, the fiat-backed stablecoin, new stablecoin supply can be minted in real-time, atomically, once the tokenized asset is received into the reserves. This is because receipt of the tokenized asset backs the corresponding newly minted tokens of the stablecoin. This can apply to any appropriate tokenized asset that is incorporated into the reserve (e.g., Bitcoin).

As described in further detail herein, the smart contract network facilitates a swap transaction to receive an amount of a tokenized asset (the first digital asset) for an equivalent amount of a digital currency (the second digital asset). The swap transaction is atomic and a number of tokens of the tokenized asset is sent directly from a wallet of a user to a provider of the digital currency, and a number of tokens of the digital currency is sent directly from the provider of the digital currency to a wallet of the user. Funds are not custodied or even ephemerally held by any components of the smart contract network to facilitate the swap transaction. Here, the number of tokens of the tokenized asset represents an amount (e.g., in USD) and the number of tokens of the digital currency represents the amount (e.g., in USD).

In accordance with implementations, and as introduced above, tokens of the second digital asset are minted on-demand, in response to the swap transaction. That is, the first digital asset is immediately considered as part of the reserve that underpins the second digital asset. Minting on-demand is distinct from minting in traditional minting contexts. In one traditional minting context, tokens of a digital asset are minted in response to receipt of another asset, such as a fiat currency. For example, and in the context of a stablecoin, tokens of the stablecoin are minted in response to deposits of fiat currency (e.g., USD) to one or more bank accounts. In this manner, the 1:1 pegging of the stablecoin to the fiat currency is maintained. As such, the one or more bank accounts can be monitored for deposits of fiat currency and, in response to a deposit, tokens of the stablecoin can be minted. In another traditional minting context, a cross-chain transfer protocol (CCTP) can be considered, in which tokens of a digital asset are to be transferred from a first chain network to a second chain network. In the CCTP context, the tokens are burned on the first chain network and are minted on the second chain network in response to a signed message. Further detail of CCTP is provided in U.S. application Ser. No. 18/127,583, filed on Mar. 28, 2023, and entitled BRIDGING BLOCKCHAINS, the disclosure of which is expressly incorporated herein by reference in the entirety for all purposes.

More particularly, CCTP can be used to facilitate scalable redemptions in a cross-chain context, in which. A tokenized asset may be issued on a variety of chain networks where CCTP is integrated. There are different ways that CCTP can be used to facilitate redemptions. As one example, CCTP can be used to transfer the tokenized asset residing on a first chain network to a second chain network where more stablecoin minting capability is available (different blockchains may have more or less minting capability based on their properties) or where the stablecoin minter solely resides to facilitate a redemption on. Afterwards, the stablecoin may be transferred over CCTP back to the first chain network. As another example, CCTP can be used as a general message passing layer. For example, on a first chain network, the tokenized asset is sent to an escrow account and CCTP is notified, sending a message to a second chain network, where the available stablecoin minting capability resides. This message is interpreted, validated, and then, in turn, triggers a stablecoin transfer over CCTP from the second chain network to first chain network to transfer the stablecoin back to the user.

FIG. 1 depicts a conceptual architecture 100 in accordance with implementations of the present disclosure. The conceptual architecture 100 includes a distributed ledger system 102 (e.g., chain network), a user wallet 104, and a tokenized digital asset wallet 108. Although the example of FIG. 1 depicts the user wallet 104 and the tokenized digital asset wallet 108 as being external to the distributed ledger system 102, the user wallet 104 and/or the tokenized digital asset wallet 108 can be maintained within the distributed ledger system 102 (e.g., as on-chain wallets).

The user wallet 104 holds a first digital asset, such as a tokenized asset (e.g., T-MMF), that a user who owns the user wallet 104 can redeem for a second digital asset, such as a digital currency (e.g., stablecoin). The tokenized digital asset wallet 106 is owned by a first entity that provides the second digital asset (e.g., a minter/burner of tokens of the second digital asset). The tokenized digital asset wallet 106 holds the first digital asset, such as the tokenized asset (e.g., T-MMF) for the first entity. For example, and as described herein, the tokenized digital asset wallet 106 can hold tokens of the first digital asset that are redeemed by users for tokens of the second digital asset.

In accordance with implementations of the present disclosure, a user that controls the user wallet 104 (e.g., the holder of the respective private key) can seek to redeem an amount of the first digital asset in the user wallet 104 for an equivalent amount of the second digital asset in the tokenized digital asset wallet 106. This redemption of a first digital asset for a second digital asset can be referred to as a swap, a transaction, and/or a swap transaction. In accordance with implementations of the present disclosure, the swap transaction is performed atomically, in real-time in a single transaction. That is, the user of the user wallet 104 need only initiate the swap transaction (e.g., as a triggering event) and all other actions to execute the redemption are executed automatically and autonomously by a smart contract network.

In further detail, the distributed ledger system 106 includes a redemption contract 110, a settlement contract 112, and a liquidity source minter 114. In some examples, and as indicated by the dashed line, the distributed ledger system 106 can optionally include a liquidity pool 116. In some examples, each of the redemption contract 110, the settlement contract 112, the liquidity source minter 114, and the liquidity pool 116, if included, is provided as a respective smart contract that is executable to perform respective functionality, as described herein. In some examples, the settlement contract 112 is a smart contract that is managed by the first entity. In some examples, the redemption contract 110 is provided by the first entity, but access for certain functionality is provided to a second entity.

In some examples, the redemption contract 110 is provided as immutable code (i.e., not upgradeable) that immutably encodes addresses, such as an address of the tokenized digital asset wallet 106. In some examples, the redemption contract 110 can only be called by users that hold the first digital asset that is eligible to be redeemed for the second digital asset. In some examples, the redemption contract 110 points to the settlement contract 112. In some examples, the redemption contract 104 can be paused by the second entity, which provides a smart contract infrastructure, on which the redemption contract 110 is executed. Example pseudo-code of the redemption contract 110 for execution of a swap transaction can be provided as:

function redeemTMMF(int amount, address investor):
    // optional check to ensure investor is eligible assert isInvestorAllowed(investor);
    // optional check to ensure amount is within limits assert isAmountWithinLimit (amount);
    // transfer TMMF tokens to the reserve tmmf.transferFrom(investor, stablecoinReserve, amount);
    // Calculate fees fees=feeCalculator(investor, amount);
    // Notify the settlement contract to complete the swap settlement.completeSwap(investor, amount, fees)

Listing 1: Example Redemption Contract Pseudocode

In the example of Listing 1, the first digital asset is T-MMF, a tokenized asset, and the second digital asset is USDC™, a stablecoin, and investor is the user that the transaction is being executed for (e.g., the user who owns the user wallet 104).

In some examples, the settlement contract 112 can be paused by the first entity. In some examples, the settlement contract 112 defines a currently set tokenized asset recipient for the swap. In some examples, the settlement contract 112 can only be called by the redemption contract 110. In some examples, the settlement contract 112 sets a liquidity source (e.g., minting on-demand and/or pulling from a wallet) transparently to the redemption contract 110 and the user. Example pseudo-code of the settlement contract 112 for execution of a swap transaction can be provided as:

function completeTMMFRedemption(investor, amount, fees):
    // Perform additional, optional checks assert isEligibleForRedemption(investor, amount);
    // Mint new stablecoin supply stablecoinMinter.mint(investor, amount—fees);
    // Optionally collect fees in stablecoin stablecoinMinter.mint(feeRecipient, fees);

Listing 2: Example Settlement Contract Pseudocode

In some implementations, the redemption smart contract 110 and the settlement smart contract 112 are provided as a single smart contract 120. For example, the redemption smart contract 110 and the settlement smart contract 112 can each be provided as coded functionality within the single smart contract 120. In some examples, the single smart contract 120 is provisioned by an entity (e.g., an entity that provides the second digital asset).

In some implementations, the user wallet 104 and the tokenized digital asset wallet 106 are each a respective externally-owned account (EOA). An EOA can be described as an account that is used to store, send, and receive digital assets and is associated with a key pair including a public key and a private key. The key pair enables transactions to be encrypted and decrypted. At a high-level, the public key is used to receive digital assets in transactions, and the private key is used to prove ownership of digital assets and spend the digital assets.

In accordance with implementations of the present disclosure, the user that owns the user wallet 104 initiates the swap transaction by calling the redemption contract 110. In some examples, calling includes sending a message to the redemption contract 110. An example message can include calling a redemption function, redeem (amount), where amount indicates an amount (e.g., in uint256) of the first digital asset that is to be redeemed for the second digital asset. In some examples, the message is signed using a private key of the user wallet 104, and the redemption contract 110 can check the signature of the message using the public key of the user wallet 104. In some examples, the message includes an address of the user wallet 104, which the redemption contract 110 can check (e.g., against a whitelist of user wallet addresses) to determine whether the user wallet 104 is allowed to execute swap transactions.

In some examples, the redemption contract 110 can apply one or more controls and/or limits. For example, checking whether the address of the user wallet 104 is permitted to request redemption transactions, as noted above. In some examples, the redemption contract 110 can apply per-user limits, global limits, or any other appropriate limits to when a redemption transaction can be executed and/or amounts of the first digital asset in the redemption transaction.

In some implementations, the redemption contract 110 transfers X tokens of the first digital asset from the user wallet 104 to the tokenized digital asset wallet 106 (e.g., in response to the signature of the user wallet 104 being determined to be valid and the address of the user wallet 104 being allowed to initiate swap transactions). For example, the redemption contract 110 executes a transfer function, transferFrom( ), on the user wallet 104 to transfer the X tokens of the first digital asset to the tokenized digital asset wallet 106.

In some implementations, the redemption contract 110 notifies the settlement contract 112 of the swap transaction. For example, the redemption contract 110 calls the settlement contract 112 to execute a redemption function, redeem (investor, amount), on the settlement contract 112. In some examples, investor is the address of the user wallet 104 and amount indicates the amount (e.g., in uint256) of the first digital asset that is to be redeemed for the second digital asset. In response, the settlement contract 112 executes a transfer function, transferFrom( ), on the liquidity source minter 114 to mint Y tokens of the second digital asset and transfer the Y tokens of the second digital asset to the user wallet 104, where the Y tokens is equal to amount. Here, minting of the Y tokens of the second digital asset can be described as minting on-demand (e.g., responsive to the swap transaction). In some implementations, $Y_1$ tokens can be provided by the liquidity source minter 114, which mints the $Y_1$ tokens on-demand, and $Y_2$ tokens can be provided by the liquidity pool 116, where $Y_1+Y_2=Y$.

In some implementations, the mechanics of communicating within the contract network is based on public key cryptography. The specific public key cryptography scheme is based on the underlying protocol of the chain network, within which the smart contracts are executed. For example, the Ethereum protocol utilizes the Elliptic Curve Digital Signature Algorithm with curve secp256k1. A private key is held by the user's wallet which corresponds to a public key and derived public wallet address. The private key is used to create digital signatures of formatted transaction data. These signed transactions may encode instructions to smart contracts to perform a variety of operations. The Ethereum protocol, as well as smart contracts, can infer the public wallet address based on these signatures to perform business logic, such as restricting certain operations to certain addresses. The specific smart contract logic may reside in the form of program bytecode that is persisted within the overall chain state.

In some implementations, one or more on-chain oracles (executed within the chain network) can be used to make off-chain data (data outside of the on-chain network) available on-chain to incorporate into smart contract transactions. In some examples, an on-chain oracle may be used to facilitate scalable, secure redemptions of a tokenized asset for the stablecoin. For example, an oracle can report a net asset value (NAV) and/or price feed of the tokenized asset. In some examples, the oracle can be incorporated into a smart contract, such as the redemption contracts. This value/price data can be used for multiple use cases, such as dynamically adjusting fees taken to facilitate the redemption. In an extreme case, a wildly divergent NAV value could indicate a run on the tokenized asset and the smart contract can include functionality to pause or delay redemptions in such a scenario. In some examples, an oracle can provide attestations as to the underlying reserves of the tokenized asset. Such an oracle can be used as a security and risk check by the redemption contract, for example, to determine whether the off-chain funds match the on-chain supply of the tokenized asset before allowing any redemptions. Divergence of the values can indicate that the tokenized fund is under-backed and, thus, new stablecoin supply should not be minted upon receipt of the under-backed asset.

Figure 2:
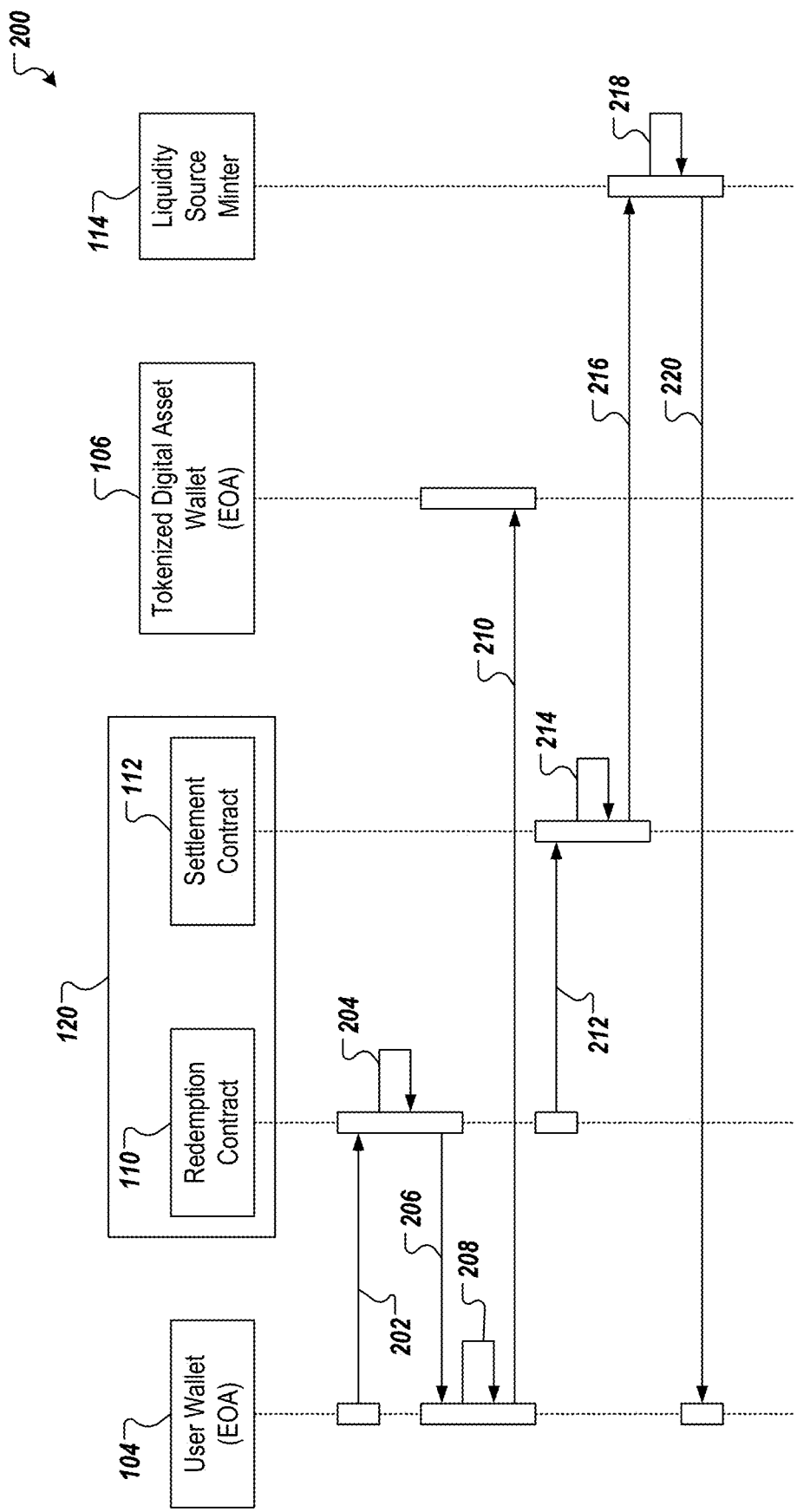
FIG. 2 is an example signal flow diagram in accordance with implementations of the present disclosure.

FIG. 2 is an example signal flow diagram 200 in accordance with implementations of the present disclosure. The example signal flow diagram 200 of FIG. 2 represents redemption of a tokenized asset for a digital currency atomically in a single transaction. To start, the user initiates the transaction by calling (202) the redemption contract 110. For example, a call is made from the user wallet 102 to the redemption contract 110 to redeem an amount of the tokenized asset. The redemption contract 110 processes (204) the message (e.g., validates) and calls (206) a transfer function (ERC20.transferFrom( )) of the user wallet 104 to initiate a transfer of the amount of the tokenized asset from the user wallet 104 to the tokenized digital asset wallet 106. In some examples, the user wallet 104 processes (208) the call and transfers (210) X tokens of the tokenized asset to the tokenized digital asset wallet 106.

The redemption contract 104 also notifies (212) the settlement contract 112 of the swap to redeem the amount of the tokenized asset to an equivalent amount of the digital currency. In some examples, the redemption contract 110 calls (206) the user wallet 104 and notifies (212) the settlement contract 112 concurrently (e.g., overlapping in time). For example, the redemption contract 110 need not wait for the amount of the tokenized asset from the user wallet 104 to be transferred to the tokenized digital asset wallet 106 before notifying the settlement contract 112.

The settlement contract 112 processes (214) the call from the redemption contract and calls (216) a transfer function (ERC20.transferFrom( )) of the liquidity source 114 to transfer of an equivalent amount of the digital currency to the user wallet 104. In some examples, the liquidity source 114 processes (218) the call to mint tokens of the digital asset (e.g., mint Y tokens) and transfer (220) the newly minted tokens to the user wallet 104.

Figure 3:
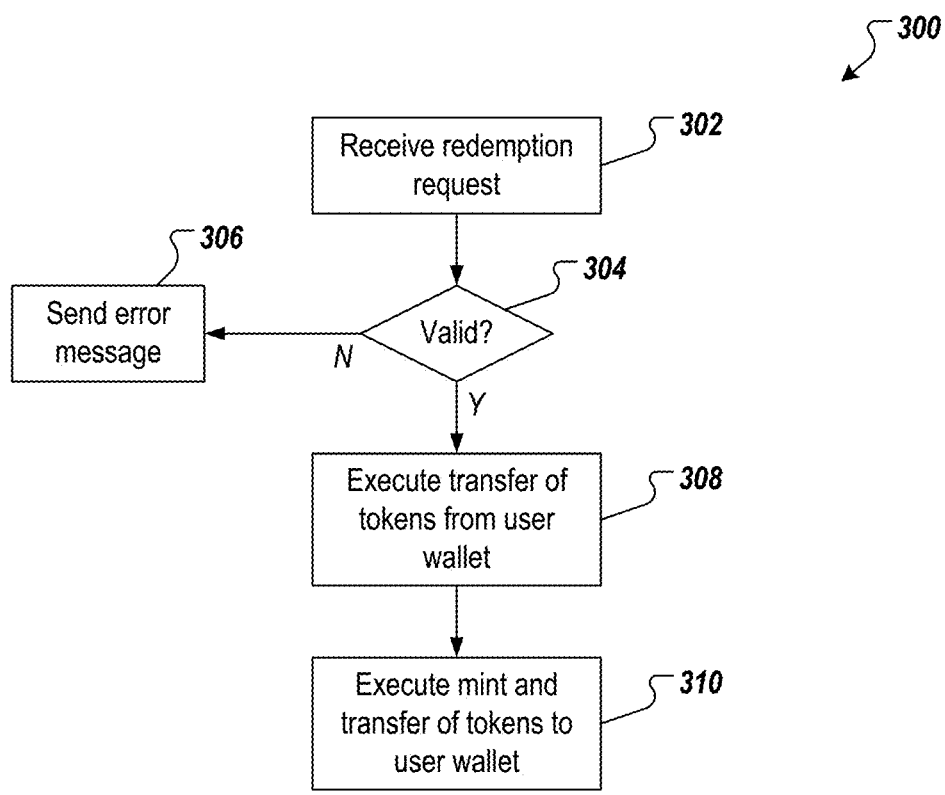
FIG. 3 depicts a flowchart of an example process that can be executed in accordance with implementations of the present disclosure.

FIG. 3 depicts a flowchart of an example process 300 that can be executed in accordance with implementations of the present disclosure. In some examples, the example process 300 is provided using one or more computer-executable programs executed by one or more computing devices.

A redemption request is received (302). For example, and as described in detail herein, the redemption contract 110 receives a call for redemption of a first digital asset from the user wallet 104. It is determined whether the redemption request is valid (304). For example, and as described in detail herein, the redemption contract 110 determines whether the redemption request is valid. If the redemption request is not valid, an error message is sent (306). For example, an error message can be sent to the user wallet 104.

If the redemption request is valid, a transfer of tokens from the user wallet is executed (308). For example, and as described in detail herein, the redemption contract 110 calls a transfer function of the user wallet to transfer X tokens of the tokenized asset to the tokenized digital asset wallet 106. Minting and transfer of tokens to the user wallet are executed (310). For example, and as described in detail herein, the redemption contract 110 notifies the settlement contract 112 of the swap transaction and, in response, the settlement contract 112 calls the liquidity source 114 to mint and transfer tokens of the digital asset to the user wallet 104. For example, the liquidity source 114 can mint and transfer Y tokens of the digital asset to the user wallet 104.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for real-time redemption of a first digital asset for a second digital asset, the computer-implemented method being executed by one or more processors and comprising:
   receiving, by a first smart contract and from a first account, a redemption request for a swap transaction to redeem an amount of the first digital asset for an amount of the second digital asset;
   responsive to the redemption request:
      determining that the redemption request is valid and the first account is allowed to initiate swap transactions,
      automatically initiating, by the first smart contract, a transfer of a first number of tokens of the first digital asset from the first account to the second account, and
      notifying, by the first smart contract, a second smart contract; and
   in response to notification by the first smart contract, automatically initiating, by the second smart contract, minting of the second number of tokens of the second digital asset and transferring of the second number of tokens of the second digital asset to the first account.

2. The computer-implemented method of claim 1, wherein the second number of tokens is minted by a liquidity source minter in response to a function executed by the second smart contract.

3. The computer-implemented method of claim 1, wherein the second account is owned by an entity that mints the second digital asset.

4. The computer-implemented method of claim 1, wherein the first digital asset comprises a tokenized money market fund (T-MMF) and the second digital asset comprises a stablecoin.

5. The computer-implemented method of claim 1, wherein the first smart contract and the second smart contract are provided as a single smart contract.

6. A non-transitory computer-readable storage medium coupled to one or more processors and having instructions stored thereon which, when executed by the one or more processors, cause the one or more processors to perform operations for real-time redemption of a tokenized asset for a digital currency, the operations comprising:
   receiving, by a first smart contract and from a first account, a redemption request for a swap transaction to redeem an amount of the first digital asset for an amount of the second digital asset;
   responsive to the redemption request:
      determining that the redemption request is valid and the first account is allowed to initiate swap transactions,
      automatically initiating, by the first smart contract, a transfer of a first number of tokens of the first digital asset from the first account to the second account, and
      notifying, by the first smart contract, a second smart contract; and
   in response to notification by the first smart contract, automatically initiating, by the second smart contract, minting of the second number of tokens of the second digital asset and transferring of the second number of tokens of the second digital asset to the first account.

7. The non-transitory computer-readable storage medium of claim 6, wherein the second number of tokens is minted by a liquidity source minter in response to a function executed by the second smart contract.

8. The non-transitory computer-readable storage medium of claim 6, wherein the second account is owned by an entity that mints the second digital asset.

9. The non-transitory computer-readable storage medium of claim 6, wherein the first digital asset comprises a tokenized money market fund (T-MMF) and the second digital asset comprises a stablecoin.

10. The non-transitory computer-readable storage medium of claim 6, wherein the first smart contract and the second smart contract are provided as a single smart contract.

11. A system, comprising:
   one or more processors; and
   a non-transitory computer-readable storage device and having instructions stored thereon which, when executed by the computing device, cause the computing device to perform operations for real-time redemption of a tokenized asset for a digital currency, the operations comprising:
      receiving, by a first smart contract and from a first account, a redemption request for a swap transaction to redeem an amount of the first digital asset for an amount of the second digital asset;
      responsive to the redemption request:
         determining that the redemption request is valid and the first account is allowed to initiate swap transactions,
         automatically initiating, by the first smart contract, a transfer of a first number of tokens of the first digital asset from the first account to the second account, and
         notifying, by the first smart contract, a second smart contract; and
      in response to notification by the first smart contract, automatically initiating, by the second smart contract, minting of the second number of tokens of the second digital asset and transferring of the second number of tokens of the second digital asset to the first account.

12. The system of claim 11, wherein the second number of tokens is minted by a liquidity source minter in response to a function executed by the second smart contract.

13. The system of claim 11, wherein the second account is owned by an entity that mints the second digital asset.

14. The system of claim 11, wherein the first smart contract and the second smart contract are provided as a single smart contract.

* * * * *